United States Patent
Mayer et al.

[11] Patent Number: 6,057,614
[45] Date of Patent: May 2, 2000

[54] DEVICE FOR SWITCHING ELECTROMAGNETIC EQUIPMENT

[75] Inventors: Klaus Mayer, Rottenburg; Ottmar Ziepel, Ofterdingen; Bernd Strauss, Eningen, all of Germany

[73] Assignee: Flender-Himmelwerk GmbH, Tübingen, Germany

[21] Appl. No.: 09/116,105

[22] Filed: Jul. 15, 1998

[30] Foreign Application Priority Data

Jul. 16, 1997 [DE] Germany ............... 197 30 440

[51] Int. Cl.⁷ .................................... H02K 11/00
[52] U.S. Cl. .................. 310/68 R; 310/68 D; 310/68 A
[58] Field of Search ................. 310/68 A–68 D, 310/68 R; 318/760, 762, 757

[56] References Cited

U.S. PATENT DOCUMENTS

| | | | |
|---|---|---|---|
| 4,047,083 | 9/1977 | Plunkett | 318/231 |
| 4,115,727 | 9/1978 | Gross | 318/212 |
| 4,122,377 | 10/1978 | Drummond | 318/45 |
| 4,482,853 | 11/1984 | Bhavsar | 318/778 |
| 4,520,300 | 5/1985 | Fradella | 318/603 |
| 4,697,130 | 9/1987 | Dadpey et al. | 318/760 |
| 4,716,515 | 12/1987 | Alexander | 363/138 |
| 4,857,818 | 8/1989 | Hobbs | 318/762 |
| 5,457,372 | 10/1995 | Pignatelli et al. | 318/760 |

*Primary Examiner*—Elvin Enad
*Attorney, Agent, or Firm*—Max Fogiel

[57] ABSTRACT

A device (1) for switching electromagnetic equipment. It is especially intended for switching a direct-current brake for a three-phase motor (3) with a switching contact (6) with a rectifier (7) with integrated protective circuitry downstream of the switching contact. There is current transformer (5) upstream of the switching contact. The transformer's primary winding is part of a conductor in the line that provides a voltage.

9 Claims, 1 Drawing Sheet

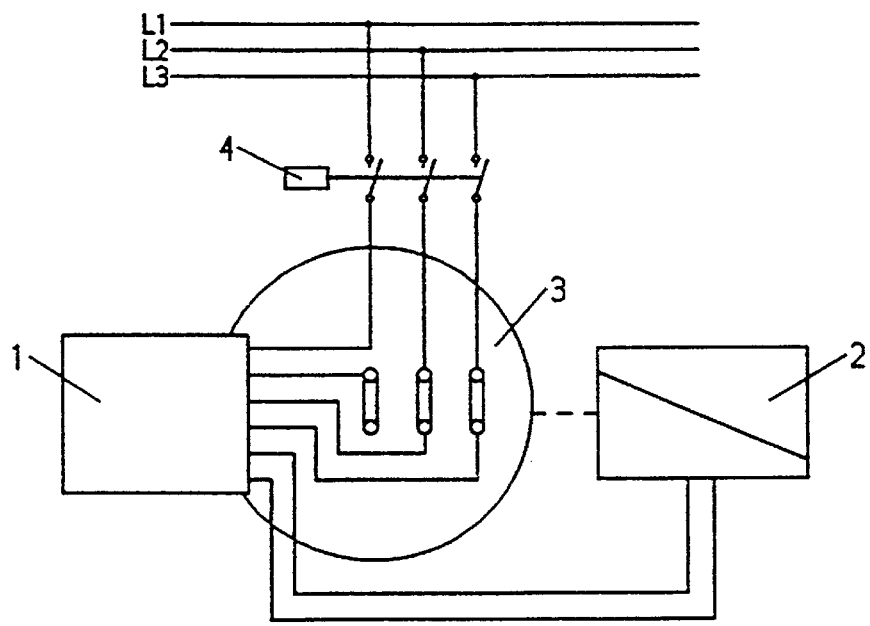
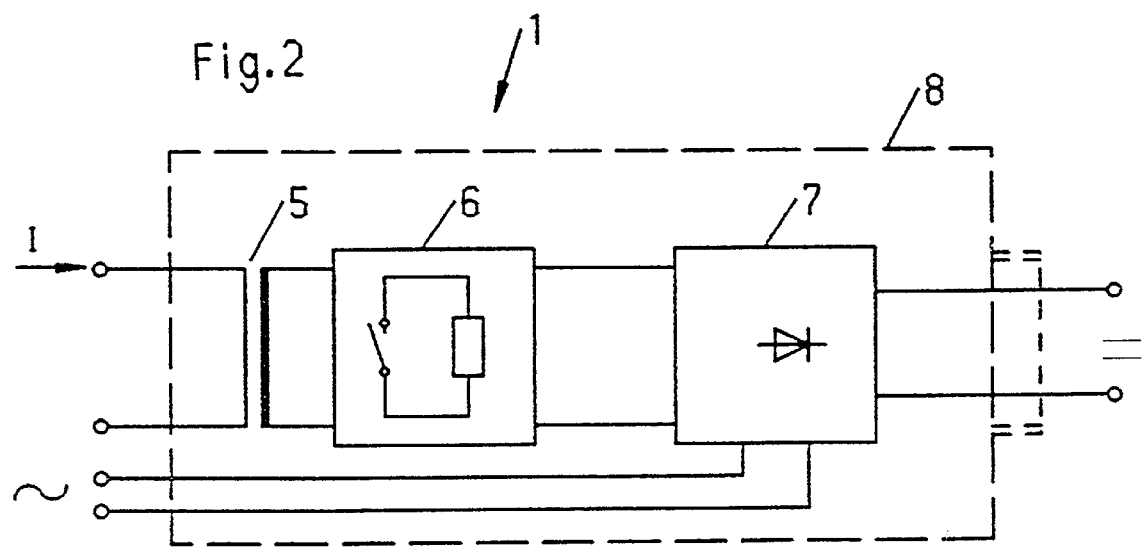

DEVICE FOR SWITCHING ELECTROMAGNETIC EQUIPMENT

BACKGROUND OF THE INVENTION

The present invention concerns a device for switching electromagnetic equipment, especially for switching a direct-current brake for a three-phase motors with a switching contact and with a rectifier with integrated protective circuitry.

Brakes of this genus can be connected to motor terminals. A device for switching a direct-current brake in a three-phase motor is known from German 3 249 877 C2. It is connected by phase conductors to a three-phase network with a single-phase braking circuit that connects the network to one phase of the motor and contains two subsidiary circuits, one with a rectifier and the other with a free-wheeling diode, with an operations contact, and with a brake contact that diverts the braking circuit, whereby one contact controls the other by way of auxiliary switching equipment. The operations contact has engagement switches in the first-and-second phase conductor and a disengagement switch in the braking circuit. The second subsidiary circuit is connected to the third-phase conductor, which lacks a switch. The brake contact has an engagement switch in the first-phase conductor and a disengagement switch in the braking circuit and an auxiliary engagement switch that controls the operations contact. Only the brake contact can be engaged and disengaged from outside.

There are drawbacks to this device. The lines that connect it to the motor terminals are long and it takes up a lot of space.

SUMMARY OF THE INVENTION

The object of the present invention is a smaller device for switching electromagnetic equipment, especially for switching direct-current brakes employed in motors, that has short connecting lines and can be rapidly engaged and disengaged.

This object is attained in accordance with the present invention by a current transformer upstream of the switching contact and in that the transformer's primary winding is part of a conductor in the line that provides a voltage.

The present invention has several advantageous embodiments. The switching device that supplies voltage can be connected to the three-phase motor over two motor-supply lines. Voltage can be supplied to the electromagnetic equipment from the switching device by way of the rectifier with integrated protective circuitry. Finally, the integrated protective circuitry can handle all the internal and external components, especially the switching contact.

The switching device in accordance with the present invention includes in a practical way a current detector in the form of a current transformer that engages and disengages an integrated voltage supply. The current detector and the requisite rectifier are integrated into a single housing along with the protective circuitry required for independent switching. The housing is advantageously mounted directly on the three-phase motor's terminal box.

BRIEF DESCRIPTION OF THE DRAWINGS

Embodiments of the present invention will now be specified by way of example with reference to the accompanying drawing, wherein FIG. 1 is a wiring diagram of a switching device in accordance with the present invention with a direct-current brake connected to a three-phase motor and FIG. 2 is a wiring diagram of one embodiment of a switching device in accordance with the present invention.

DESCRIPTION OF THE PREFERRED EMBODIMENTS

Lines extend from the three phase conductors L1, L2, and L3 illustrated in FIG. 1 to an operations contact 4. Two of the output terminals of operations contact 4 are directly connected to two of the terminals of a three-phase motor 3. One output terminal of operations contact 4 is connected to the motor's third terminal by way of a switching device 1. Switching device 1 also connected to the motor's two other terminals. Two separate lines extend from switching device 1 to a direct-current brake 2 associated with three-phase motor 3.

The advantageous switching device 1 illustrated in FIG. 2 has a current transformer 5. The secondary winding of current transformer 5 is connected to a switching contact 6. Its primary winding on the other hand is part of the lines leading to a voltage supply. A rectifier 7 is connected to switching contact 6 and to a source of voltage, preferably by way of the terminals of three-phase motor 3. Integrated into rectifier 7 is protective circuitry that preferably depends on an RC stage or on varistors. Two output terminals connect rectifier 7 to the motor's brake. The switching device is compactly accommodated in an explosion-resistant housing 8.

Voltage is supplied to switching device 1 and to the electromagnetic equipment, preferably direct-current brake 2, it controls only by way of the line leading to the three-phase motor. No additional wiring is necessary, minimizing loss.

Current transformer 5 is essentially particularly intended for supplying voltage to all the downstream electronics and hence to ensure reliable control of the downstream components. Current I flowing through the current transformer's primary winding induces voltage in its secondary winding and hence detects that the motor is on. The voltage induced in the current transformer's secondary winding produces a current that closes switching contact 6, engaging rectifier 7. Rectifier 7 supplies current to the electromagnetic equipment. This current activates the braking coil of the direct-current powered resilient brake and releases it.

As long as there is no current flowing through the primary winding of current transformer 5, the motor will be detected to be off. Switching contact 6 will open essentially simultaneously and the electromagnetic equipment will immediately be disconnected. The brake's braking coil will be deactivated and its compression springs released, engaging the brake. The protective circuitry integrated into rectifier 7 will simultaneously ensure a well defined decrease in the current induced in the braking coil.

The protective circuitry is essentially intended to prevent the switching peaks or induction-voltage peaks that occur during the initiation and termination of inductivity. It accordingly includes such appropriate voltage limiters as varistors, Zener diodes, etc. With an advantageous combination of barrier diode and varistor, the protective circuitry can decrease the voltage threshold to below the power-supply voltage, which is usually 400 V. This will ensure maintenance of the thresholds prescribed for electromagnetic compatibility. The well-defined decrease in inductive energy will also minimize dead times in the deactivation of electromagnetic equipment, the direct-current brake in the present case.

The direct supply of voltage by switching device 1 and the associated control of rectifier 7 by way of current transformer 5 eliminates the need for the separate line that is definitely responsible for decelerated deactivation in the inductive energy present in the motor's winding also feeds the braking coil in direct-current brake 2 for example. Since switching device 1 does not need to be resupplied by way of galvanic separation of current transformer 5, both disengagement and coupling will be very rapid.

The advantageous switching device 1 in accordance with the present invention can basically be employed to control any electromagnetic equipment that operates in conjunction with three-phase or alternating-current motors. Solenoids and all other similar electromagnetic equipment and components can also be control to advantage with switching device 1.

What is claimed is:

1. An arrangement for switching electromagnetic means in form of a direct-current brake for a three-phase motor, comprising: a single current transformer with a primary winding and a secondary winding; a switching contact connected to said secondary winding; a rectifier with integrated protective circuitry connected to said contact; a source of current connected to said primary winding, current flowing through said primary winding induces voltage in said secondary winding for closing said switching contact and detecting when said motor is operating; said rectifier having an output connected to said brake for actuating said brake, said primary winding being a part of a conductor of a line leading to said source of current.

2. An arrangement as defined in claim 1, including a voltage supply connected to said rectifier and two motor supply lines for connecting to said motor.

3. An arrangement as defined in claim 1, wherein said rectifier with integrated protective circuitry supplies voltage to said brake.

4. An arrangement as defined in claim 1, wherein said integrated protective circuitry controls said switching contact.

5. An arrangement as defined in claim 1, wherein said current transformer and rectifier with protective circuitry and connections are integratable in a unit.

6. An arrangement as defined in claim 1, wherein only one phase of said motor is connected for braking said motor.

7. An arrangement as defined in claim 1, wherein one winding of said transformer comprises only one phase of a three-phase supply for operating said motor.

8. An arrangement for switching electromagnetic means in form of a direct-current brake for a three-phase motor, comprising: a single current transformer with a primary winding and a secondary winding; a switching contact connected to said secondary winding; a rectifier with integrated protective circuitry connected to said contact; a source of current connected to said primary winding, current flowing through said primary winding induces voltage in said secondary winding for closing said switching contact and detecting when said motor is operating; said rectifier having an output connected to said brake for actuating said brake; one phase only of said motor being connected for braking said motor; one winding of said transformer comprising only one phase of a three-phase supply for operating said motor.

9. An arrangement for switching electromagnetic means in form of a direct-current brake for a three-phase motor, comprising: a single current transformer with a primary winding and a secondary winding; a switching contact connected to said secondary winding; a rectifier with integrated protective circuitry connected to said contact; a source of current connected to said primary winding, current flowing through said primary winding induces voltage in said secondary winding for closing said switching contact and detecting when said motor is operating; said rectifier having an output connected to said brake for actuating said brake; a voltage supply connected to said rectifier and to motor supply lines for connecting to said motor; said rectifier with integrated protective circuitry supplying voltage to said brake; said integrated protective circuitry controlling said switching contact; a housing with threading for mounting on conventional motor-terminal boxes; said current transformer and rectifier with protective circuitry and connections being integratable in a unit; said threading corresponding to a DIN standard; only one phase of said motor being connected for braking said motor; one winding of said transformer comprising only one phase of a three-phase supply for operating said motor.

* * * * *